(12) United States Patent
Reno et al.

(10) Patent No.: US 8,215,557 B1
(45) Date of Patent: Jul. 10, 2012

(54) LOW PROFILE COLOR-BASED COUNTING SYSTEM

(75) Inventors: Mary Reno, Reading, MA (US); Doyle M. Jensen, Draper, UT (US); Joseph H. Boyer, Johnson City, NY (US); William Bennett, Binghamton, NY (US); James G. McGonigal, Binghamton, NY (US); Mark D. Jones, New Milford, PA (US); Todd E. Bower, Endicott, NY (US); Alecia K. Lashier, Johnson City, NY (US); Fletcher Chapin, Jr., Maine, NY (US); Yan L. Liang, Endicott, NY (US); John P. Boyer, Apalachin, NY (US)

(73) Assignee: Innovation Associates, Inc., Johnson City, NY (US)

( * ) Notice: Subject to any disclaimer, the term of this patent is extended or adjusted under 35 U.S.C. 154(b) by 0 days.

(21) Appl. No.: 12/948,822

(22) Filed: Nov. 18, 2010

(51) Int. Cl.
*G06K 15/00* (2006.01)
(52) U.S. Cl. .................... 235/462.13; 235/462.25
(58) Field of Classification Search ............ 235/462.13, 235/462.14, 462.19, 462.25
See application file for complete search history.

(56) References Cited

U.S. PATENT DOCUMENTS

| | | | |
|---|---|---|---|
| 5,093,716 A * | 3/1992 | Kondo et al. | 348/224.1 |
| 5,213,232 A | 5/1993 | Kraft et al. | |
| 5,884,806 A | 3/1999 | Boyer et al. | |
| 5,907,493 A | 5/1999 | Boyer et al. | |
| 6,370,215 B1 * | 4/2002 | Pinto et al. | 377/6 |
| 6,738,723 B2 * | 5/2004 | Hamilton | 702/128 |
| 6,944,324 B2 * | 9/2005 | Tran et al. | 382/143 |
| 7,471,318 B2 * | 12/2008 | Butterworth | 348/231.99 |
| 7,599,516 B2 | 10/2009 | Limer et al. | |

* cited by examiner

*Primary Examiner* — Daniel StCyr
(74) *Attorney, Agent, or Firm* — Mark Levy; Hinman, Howard & Kattell, LLP (57) ABSTRACT

A low profile, color-based counting system. A housing has a light source, such as a matrix of LEDs, preferably disposed in the housing for generating electromagnetic radiation upwardly. A removable, translucent tray is disposed above the light source. A second light source can be added above the tray, directing light downwardly thereto. A color camera is mounted on the housing and above the removable translucent tray.

18 Claims, 6 Drawing Sheets

LOW PROFILE COLOR-BASED COUNTING SYSTEM

FIELD OF THE INVENTION

The present invention relates generally to counting systems for counting individual units and, more particularly, to a color-based counting system.

BACKGROUND OF THE INVENTION

The field of pill dispensing features many different mechanisms that are designed to recognize, sort, and count pills and capsules of all types and sizes. Tablet counters traditionally direct pills past a photoelectric device that counts pills as they intersect an optical beam.

As used herein, the term "pills" is understood to include pills, tablets, capsules and all other containers for, and shapes of, pharmaceuticals to be swallowed, chewed or dissolved by the end user.

The major problem with many of these devices is reliability. In order for one apparatus to properly sort or recognize different pills by size and shape, it has often been necessary to modify the design of the dispenser to fit each particular shaped or sized pill. Often, adjustments must be performed to the machine during operation. Such changes greatly inhibit the use of such devices in automated, or semi-automated, or continuously run facilities. It is critically important that, in such automated or semi-automated dispensing systems, such as are used in pharmaceutical applications, the counting, identifying and dispensing of pills be accurate, since errors in quantities and identification of pills may lead to serious injury.

The pharmaceutical dispensing system of the present invention comprises a standardized or universal type module with a plurality of individual cells, each of which can be easily loaded through a hopper, capable of being filled with any type of pills, tablets and capsules of varying size and shape. The pharmaceutical dispensing system of the present invention incorporates a new apparatus that is reliable, and which can handle a wide variety of pills, tablets, and capsules without requiring adjustments or modification to the basic design. The cell dispenser preferably has a simple screw-type feed and dispensing mechanism that can operate at different speeds to accommodate different pills. A multiplicity of cells can be arrayed in one of a number of modules that is computer controlled. The speed of each dispensing mechanism is controlled by a main processor, so that each cell can be individualized for a specific pill, tablet, or capsule. In this manner, a wide range of pills can be dispensed as needed for a pharmaceutical facility. The computer at the pharmaceutical facility communicates with the main processor, and informs the main processor what prescriptions must be filled. The main processor keeps track of all of the prescriptions, and establishes priorities based on pharmacy inputs.

The system comprises a large bank of dispensing cells that is more cost effective and compact than existing pill dispensing apparatuses. Each cell in the array is able to dispense and count accurately at a relatively high speed, resulting in increased overall system throughput. The dispensing cell design allows for its use in banks or arrays, which are compact enough to allow a single operator to handle 200 or more dispensers from a single location. The form of the device also allows its use in an automated dispensing or prepackaging facility, allowing such facilities to be configured into economical systems.

As aforementioned, the pharmaceutical system provides a basic design that can handle a complete range of tablet or capsule sizes and shapes. This is accomplished without requiring different mechanical operation, or mechanical adjustment. The cells feature a basic design that is controlled electronically, as described in U.S. Pat. No. 5,884,806, described in greater detail hereinbelow. The computer is programmable to provide different drive voltages that adjust the timing and operation of the mechanism, which in turn sets the device to operate specifically for a particular pill.

The mechanism of each cell features a sloped tube containing a helical interior ridge. The tube is set at an angle to the horizontal. The sloped tube with its helical ridge is rotated, causing pills fed to the mouth of the tube to move upwardly along the tube against gravity, thereby becoming separated either individually, or into smaller groups. As the pills reach the end of the tube, they are individually separated, and can be accurately dispensed from the end thereof. The falling pills are then detected individually by photodetector cells, and are thereby reliably counted. The computer controlling the dispensing operation is programmed to recognize a double feed, or a broken, fragmented pill.

DISCUSSION OF THE RELATED ART

U.S. Pat. No. 7,599,516, issued to Daniel J. Limer, et al. on Oct. 6, 2009 for MACHINE VISION COUNTING SYSTEM APPARATUS AND METHOD, discloses a machine-vision-based counter including an image acquisition component (imager), wherein light provides discrimination between a background field and imagable units located away from the imager. The imager outputs data representing the field and units; an image processor receiving imager data finds countable units therein. An operator interface accepts command inputs and presents count output. A controller manages image acquisition, processor, and operator interface functions. A counting method includes configuring an imager to detect light, directing light from a source to units positioned to be detected by the imager, and directing the light to the imager. The method includes discriminating between a background field and imagable units; providing, as an imager output, data representing the field and units; configuring an image-processor to receive imager data; configuring the processor to interpret the data as counted units on a background field; and configuring an operator interface to present a count result.

U.S. Pat. No. 5,907,493, issued to Joseph H. Boyer et al. on May 25, 1999 for PHARMACEUTICAL DISPENSING SYSTEM, discloses a pharmaceutical dispensing system including a plurality of standardized or universal-type cells disposed in a large array called a module. One or more modules may be disposed in a given pharmacy, and one or more pharmacies may be monitored by a central computer. The system for filling prescriptions includes a graphical interface processing system for monitoring operations of each cell, wherever located, and for sequentially and interactively prompting an operator to perform appropriate; predetermined steps. The system for filling prescriptions sequentially prompts a technician or operator to perform predetermined steps, dependent upon verification of the completion of a prior or previously completed step in the sequence. In a semi-automatic mode, the pharmacist is directed, by suitable prompts on the computer display screen, as to the necessary steps and locations in filling each prescription. The main computer stores information of a plurality of drugs in predetermined, separately-addressable cells, and arranges that information to provide optimum efficiency of pharmacy operations.

U.S. Pat. No. 5,884,806, issued to Joseph H. Boyer et al. on Mar. 23, 1999 for DEVICE THAT COUNTS AND DISPENSES PILLS, discloses a pill-dispensing system which has a number of standardized, or universal-type, modules. Each module has a rotating, helix-drive mechanism, which is rotationally controlled by a microprocessor. The helical-drive allows for the dispensing of pills of all shapes and sizes one at a time. The helix of the drive is securely mounted within a rotatable, hollow tube. A stationary collar is mounted adjacent the upper end of the rotating tube. The rotating helix extends into the stationary collar and forces pills from the hollow tube to the dispensing edge of the stationary collar. A hopper positioned at the input end, or mouth of the tube, feeds a batch quantity of pills to the drive mechanism. The tube is angled upwardly from the mouth portion, so that the pill-dispensing end is positioned above the input end. In this fashion, the pills that are fed through the tube move upwardly against gravity.

U.S. Pat. No. 5,213,232, issued to Thomas L. Kraft et al. on May 25, 1993 for ROTATING APPARATUS FOR DISPENSING SINGLE HOMOGENEOUS UNITS, discloses an apparatus for dispensing single homogeneous units upon rotation of the apparatus comprising a generally circular walled container having a bottom for holding the units. A discharge area is located distally from the bottom for receiving the units and for discharging them upon rotation of the apparatus. A helical spiraled rib member located on the generally circular walled container extends from the bottom of the container and along the circular walls of the container for creating during rotation a continuously variable inclined surface along the helical spiraled rib member and the circular walls thereof. The helical spiraled rib member has a helix depth from the circular wall of the container sufficient for advancing only a single homogeneous unit along the helical spiraled rib member and the generally circular wall of the container until a single unit reaches the discharge area.

In addition to requiring the bottom (making it impossible to incorporate in a system with a hopper), the Kraft et al. system is not adapted to be automatically advanced.

The dispensing cell of the present invention, however, features significant improvements over previous existing concepts, such that the basic simplicity and reliability is retained, but speed and accuracy are enhanced.

SUMMARY OF THE INVENTION

In accordance with the present invention, there is provided a low profile, color-based counting system. A housing optionally has at least one light source, such as a matrix or an array of LEDs, disposed in or proximate the housing for generating electromagnetic radiation. A translucent tray, which may be removable, is preferably disposed above the light source. A color camera is mounted on the housing and above the removable translucent tray.

BRIEF DESCRIPTION OF THE DRAWINGS

Various objects, features, and attendant advantages of the present invention will become more fully appreciated as the same becomes better understood when considered in conjunction with the accompanying drawing, and wherein.

DETAILED DESCRIPTION OF THE PREFERRED EMBODIMENT

The invention is a low profile, color-based counting system used to count discrete units including, but not limited to, pills, tablets, and capsules. A housing optionally has a light source, such as a matrix of LEDs, disposed in or proximate the housing for generating electromagnetic radiation. A translucent tray that may be removable is disposed above the light source in the preferred embodiment. A color camera is mounted on the housing and above the translucent tray.

Figure 1:
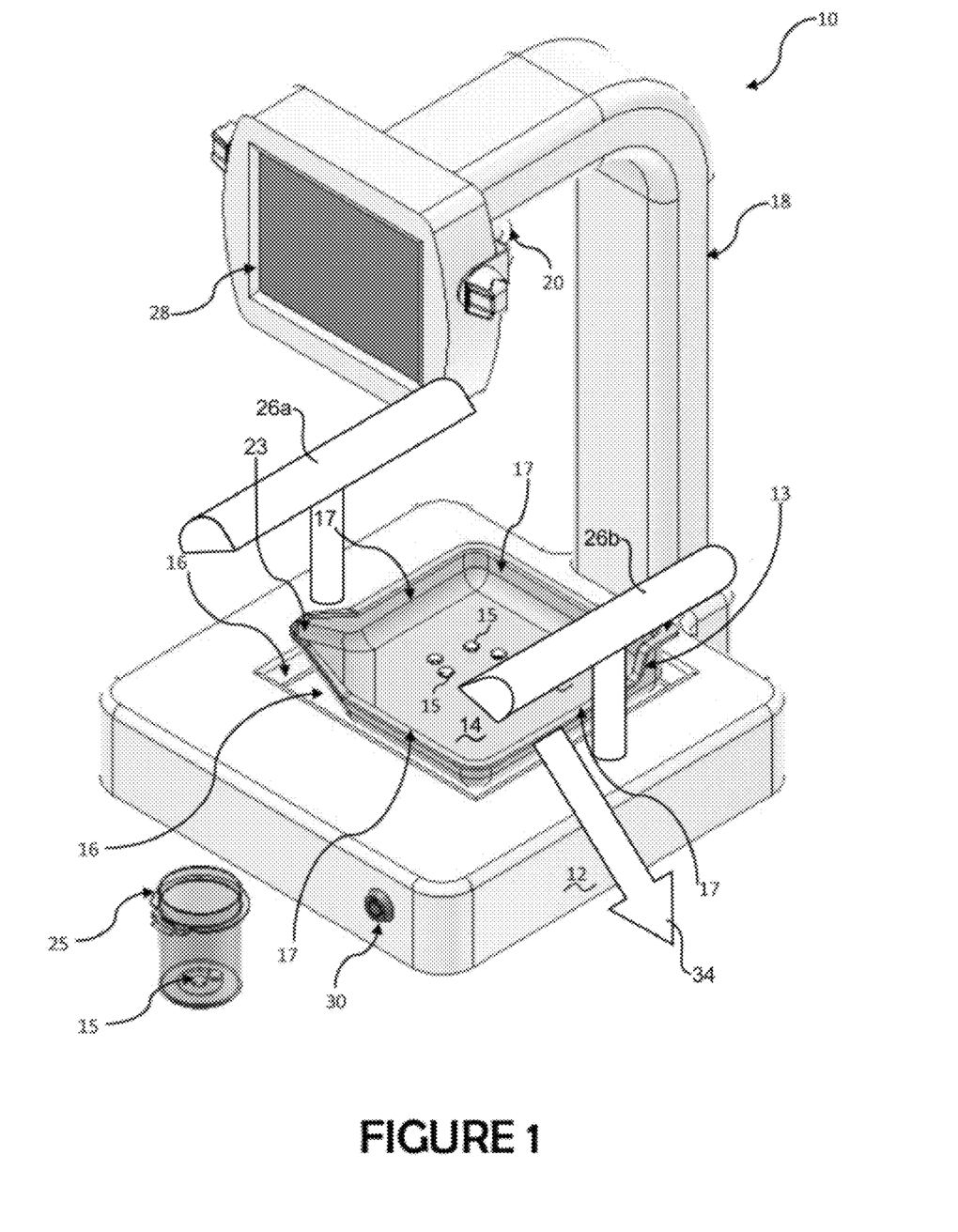
FIG. 1 is a perspective view of a housing for a counter according to one embodiment of the invention.

FIG. 1 shows a counter 10, having a base 12 for placement of the counter 10 on a surface. The counter 10 includes a removable tray 14 having a major plane for positioning units (e.g., pills, tablets, capsules, etc.) 15 to be counted, an optional electromagnetic source of energy (herein referred to as "light source") 16 oriented to provide electromagnetic illumination upward from the upper surface of the tray 14, and a neck 18, extending upward from the vicinity of the tray 14. Light source 16 is preferably an array of LEDs, but other forms of electromagnetic sources can be used, including, but not limited to incandescent lights, fluorescent lights, LCDs, infrared sources, etc. An auto focus color camera 20, such as an IDS 8 megapixel (MP) unit, manufactured by Cognex Corporation, is mounted at the distal extremity of neck 18. Tray 14 comprises a removable, translucent surface that diffuses EM radiation emanating from light source 16. Color camera 20 includes an appropriate lens, not shown, that may be focused. Color camera 20 is electrically connected to an image acquisition component (imager), that is focused toward the tray 14, permitting the imager to acquire an image of any materials 15 placed on tray 14 and optionally backlit by light source 16.

Retaining walls 17 surround tray 14 to help retain units 15 on tray 14. On the distal side of tray 14 is positioned an emptying protrusion 13 used to tilt and lift tray 14 so that units 15 are directed towards a user's position that directs units 15 into a vial 25. It should also be understood that vial 25 can be supported by a separate, suitable, free-standing vial holder, not shown, proximate the counting system 10. Emptying protrusion 13 can also be manipulated by a user to lift and remove tray 14, if desired by the user, to sweep units 15 off tray 14 after an image of units 15 on tray 14 is captured by color camera 20.

Color camera 20 can produce a full color, high resolution image of units 15 resting on tray 14. The light-emitting diode array or matrix 16, in the preferred embodiment, may be momentarily deenergized, and one or more other light sources 26a, 26b preferably above the major plane of tray 14, as shown, can be energized to illuminate the upper portions of units 15, as color camera 20 creates its image, so the captured image is of the tops and/or sides of units 15, in addition to silhouettes of units 15, as typically captured by monochrome cameras. Light sources 26a, 26b, in alternate embodiments, can be placed on the side or sides of tray 14, although placement of one or both light sources 26a, 26b above the plane of tray 14 is preferable. Color camera 20 records the color and three-dimensional shape of units 15 and any printing or imprinting thereon for archival purposes. Color camera 20, in association with light source 16, is used to count the individual units 15. Color camera 20 can also detect bar codes on a container 22 (FIG. 2) disposed on one or more containers, such as, vials, boxes, and the like. Such bar codes can include, but not be limited to, information representative of type of medication, source of medication, identification of stock bottles, identification of the operator, and evaluation of filled vials. Moreover, since color camera 20 is auto focusing, such a container 22 can even be hand carried in front of color camera 20 by a human user or robot arm, not shown.

A processor and associated display 28, which may be an LCD or an LED display in the preferred embodiment, is tiltably mounted to neck 18, but may be mounted directly to housing 12 (FIG. 1), in an alternate embodiment. Display 28 may also include touch screen function. Power control in the form of pushbutton switch 30 is positioned on a surface of the base of housing 12.

Figure 2:
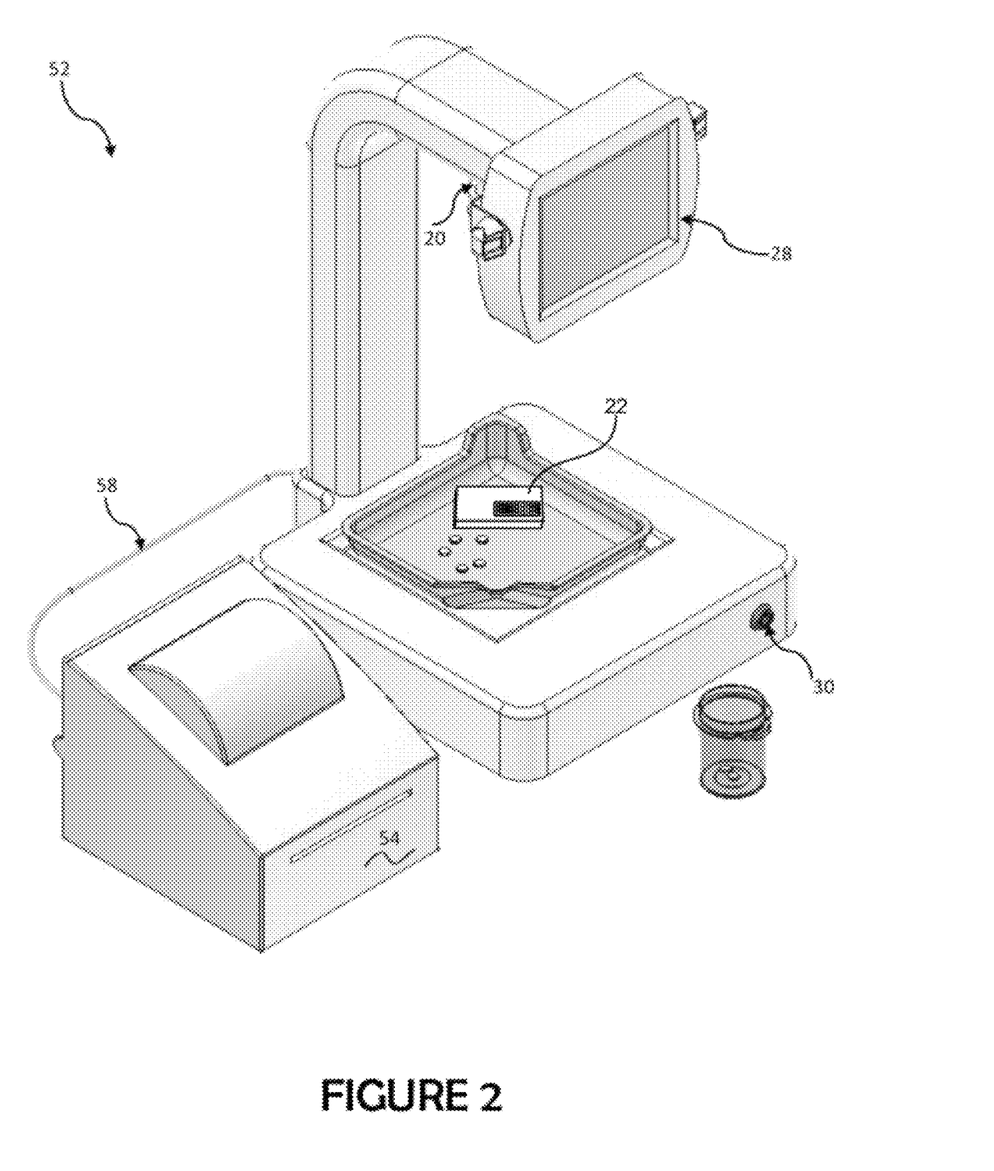
FIG. 2 is a perspective view of a counter according to another embodiment of the invention.

FIG. 2 shows a counter 52, substantially similar to the counter 10 of FIG. 1, further illustrating a printer 54 connected to counter 52 by a cable 58. This arrangement, or a similar one wherein printer 54 is connected using a wireless link and may be separately powered, may be used in lieu of a more fully integrated apparatus in some applications.

Figure 3:
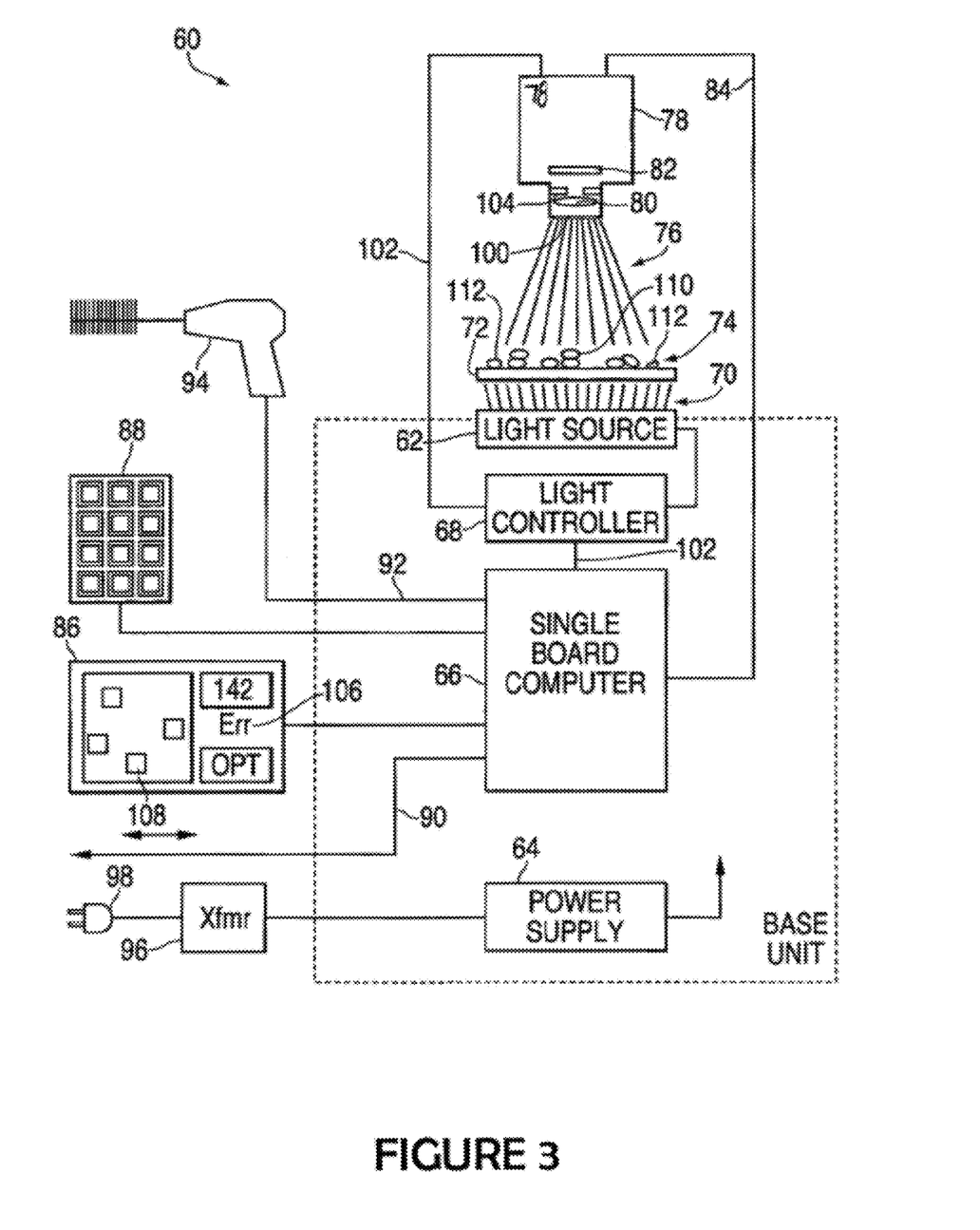
FIG. 3 is a block diagram consistent with a method according to one embodiment of the invention.

FIG. 3 shows a counter 60, in block diagram form, having some of the functional elements indicated in the foregoing figures. Counter 60, like the counter 10 of FIG. 1, can take the form of a single, substantially unitized apparatus. As shown in FIG. 3, a light source 62 in the form of an electromagnetic field generator such as an array of LEDs, fluorescent or incandescent lamps, etc., powered from a power supply 64 with timing controlled from a processor 66, and in some embodiments including a discretely identifiable light source power control module 68, emits radiation 70 that passes through a tray 72 and is blocked in part by units 74. A portion of the unblocked radiation 76 impinges on a color camera 78 functioning as an image acquisition component, wherein a focusing mechanism 80 such as a pinhole or a lens may be used to place an image in the form of silhouettes of units 74 on a detector 82, functioning as a machine vision transducer.

Detector 82 couples the image in a transferable format such as a digital data stream to processor 66. The image is coupled via a power and communication link 84 such as a power-carrying electrical data signal cable or a combined power cable and fiber optic link, in the embodiment shown. Processor 66 further interprets the image of camera 78 to generate a count of units 74 at periodic intervals. This count may be presented on a touch screen display 86, and may be updated at a rate determined by a control routine stored within processor 66 or determined by input from a user.

Additional functions of counter 60 may include local control input using a keypad 88. Such a keypad 88 may have the form of a touchpad overlay. Keypad 88 can be superimposed on the display component 86.

In some embodiments, another included interface 92 may support an optical reading device 94. Power for operating counter 60 may be self-contained, using some combination of replaceable, rechargeable, and/or solar batteries included in power supply 64. Counter 60 can be externally powered using direct or indirect feed (such as from an external transformer 96) from a premises wiring plug 98, or may be otherwise energized.

In some embodiments, a planar array of visible light or infrared LEDs in light source 62, substantially matched for uniformity of emission intensity and wavelength, and affixed below tray 72, may be used to establish a diffuse light source 62. In other embodiments, a single, possibly higher intensity device, effectively a point source, the emission from which is distributed and directed by a lens, a focusing reflector, or a combination of such accessories, for example, may be used as light source 62. In other embodiments, the function of light source 62 can be accomplished with one or more light sources disposed on one or more sides of tray 14 (FIG. 1).

In embodiments having a plurality of light sources and/or a source emitting a plurality of colors, reflected light in addition to or in place of silhouette illumination may be detected by color camera 78. Camera 78 may acquire a reference brightness level when tray 72 is empty. The reference level can then be used to establish contrast levels during counting. Moreover, color camera 78 is used to provide information related to the color of units 74, which is often an important or crucial step in the counting process.

Illumination using energy other than infrared and visible light may be used in some embodiments. Within the electromagnetic spectrum, microwave radiation may provide adequate resolution in some embodiments, while ultraviolet light or x-rays may be usable in other embodiments.

Contrast between the appearance of the surface of tray 72 and of units 74 being counted may be further enhanced, particularly in a high ambient light level or broad-spectrum light environment, by positioning one or more filters 100 having properties suitable for limiting light impinging on the detector 82 to spectral elements of interest.

In embodiments using strobing, synchronization by a sync signal line 102 may be directed from a relevant circuit element such as processor 66 or power control module 68 to color camera 78. Applying the sync signal 102 to color camera 78 allows image acquisition to be synchronized to the availability of light from source 62. A strobe function can reduce energy flux and gradient into the units being counted, thereby impeding degradation for some heat-sensitive, light-sensitive, or short-life medications or packaging configurations.

Light emission may be substantially random in phase and direction for some light sources 62. For embodiments having comparatively uniform emission distribution over the surface of source 62, or having comparatively uniform areal intensity striking camera 78, signal processing may be simplified compared to signal processing required for sources having pronouncedly nonuniform emission. In embodiments having less uniformity, either over the surface of source 62 or over apparatus lifetime, a baseline surface mapping can be established and refreshed periodically as appropriate, to precompensate for radiation variation. Furthermore, in some embodiments, adjusting emission intensity or emission pulse duration can be used to regulate signal input level into camera 78 to remain within a range. In some embodiments, camera 78 may allow detector 82 sensitivity to be controlled over portions of the image area of camera 78, so that precompensation for areal intensity variation may be performed prior to providing the image information from camera 78 to processor 66. Similarly, impinging light may be regulated or switched using a mechanical or electrochromic shutter 104.

Figure 4:
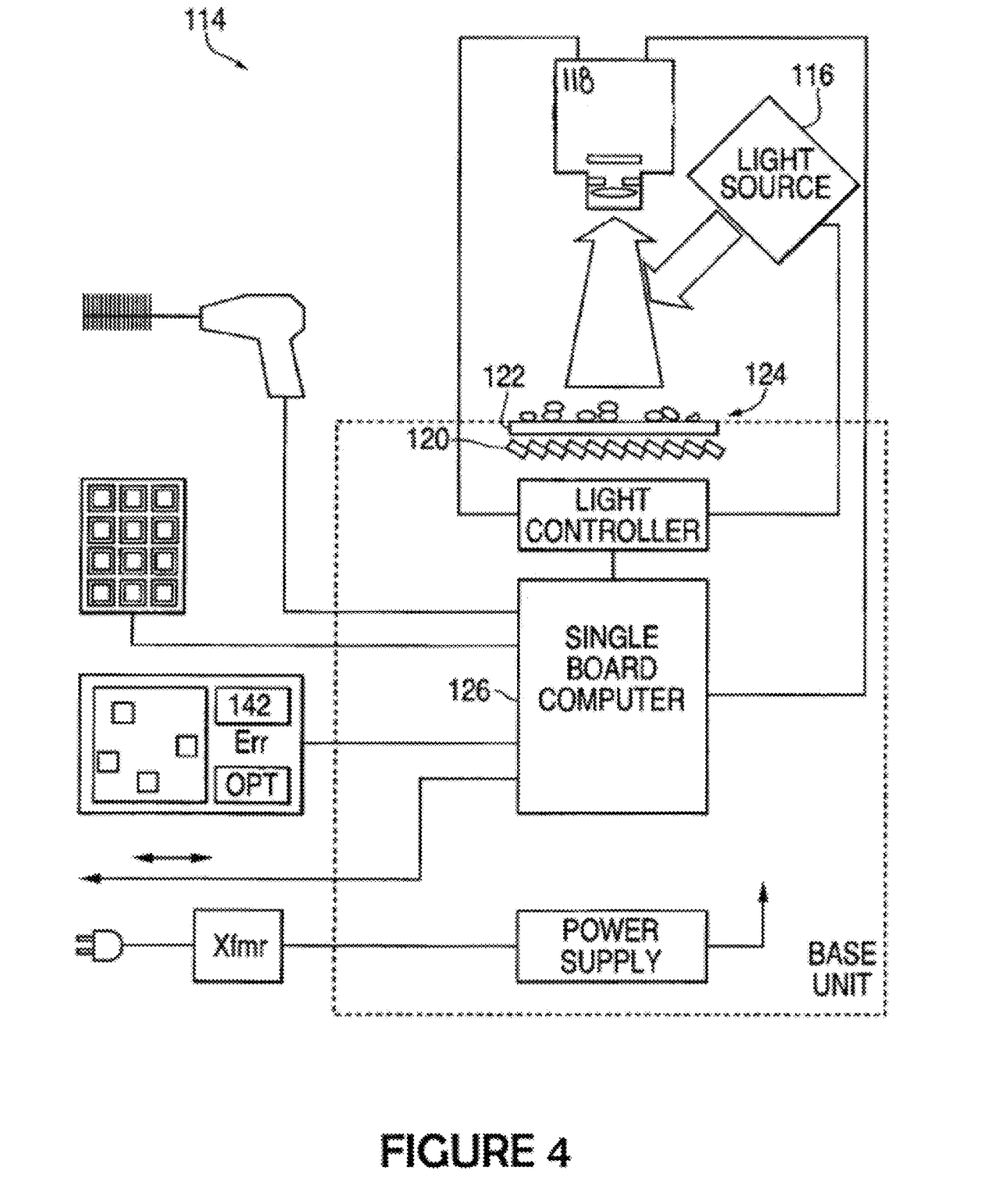
FIG. 4 is an alternative embodiment in block diagram form.

FIG. 4 is an example of another embodiment of counter 114, wherein a second source of electromagnetic energy 116 is positioned substantially at or above the major plane of the tray 122. Such a source 116, consisting of one or more EM generators may be diffuse, that is, may have largely uniform and low energy density emission over a relatively broad surface, or may approximate a point source. Each such configuration, as well as intermediate forms such as multiple discrete spot sources, may be superior in conjunction with particular imaging methods. Second source of electromagnetic energy 116 is used to illuminate the top and sides of units 124, so that images that include colors can be captured by color camera 118 with an auto focus lens and can be archived. Camera 118 can also capture one or more images of a container 22 (FIG. 2), including barcodes or other indicia printed thereon.

For some embodiments, a passive reflector 120 beneath the tray 122, which may be focused, can be used to reflect light from the source of electromagnetic energy 116 back to the camera 118, with deflection or diffusion of the light by the units 124 providing contrast. The reflector 120 is a collapsed type, such as a metalized negative Fresnel lens; other configurations are feasible as well. The size shown for the reflective components of the reflector 120 is larger in FIG. 4 than in some embodiments, with the understanding that finer scale reflective components can more readily establish a low-profile, accurately focused mirror, while components comparable in scale to the units being counted may be preferable for other embodiments. For still other embodiments, a tray or subtray surface that largely absorbs or deflects the wavelength of the source of electromagnetic radiation 116 can be used, so that the units 124 are seen by camera 118 as brightly lit against a relatively dark background. The last embodiments could require an adaptation of a processor algorithm to account for discrete specular reflections from gel capsules, coated pills, and other shiny unit surfaces, for example. Color camera 118 can also be used to distinguish pills having such characteristics. Similarly, variations in reflectivity of subject units 124 may require added camera bit depth or processor algorithmic complexity in some such embodiments. Embodiments using reflectors 120 beneath the tray 122 could be unsuitable for counting some types of reflective units unless the position and other attributes of the light source were arranged to accommodate such uses, such as by offsetting the source of electromagnetic energy 116 with respect to the central axis of the field of view of camera 118.

In still other embodiments, comparable resolution and speed may be achieved using a narrow, directable spot of light, such as a laser beam within the source 116, directed over an area using a Micro Electro Mechanical System (MEMS) or other beam steering system. In such an embodiment, the beam is scanned over the tray 122, and the scan result is detected by color camera 118. Such an embodiment may use silhouette, reflection, color, or combined imaging, and may use a plurality of light sources of different wavelengths. The analytical algorithm for evaluating an image so acquired, discussed below, may also be adapted, such as by performing a low-resolution scan with the beam to find unit candidates, then edge tracing or rescanning at higher resolution to evaluate areas of interest. The process may further vary spot size.

As an operational consideration, the areal counting function process may allow a dispensing user to pour out units onto the tray 122, for example, until an approximately correct count is seen on the display 28 of FIG. 1. The user can then verify that no piles obscuring observation are present on the tray 122, and can manually redistribute the units 124 if necessary, with the results presented effectively instantaneously at each step.

In some embodiments, in addition to providing a count of discretely identifiable units interrupting illumination over several consecutive scan lines at a broadly uniform position with reference to a first end of the scan lines, a processor 66 may provide an inspection function. That is, processor 66 may be configured to anticipate the approximate areal coverage or "blob size" of the units being counted, and to determine for each discretely identifiable unit whether the size generally corresponds to that expected for such a unit. Thus, for example, where unit size is too small to be consistent with any anticipated orientation for that unit, the unit may be tagged as possibly chipped or a fragment. Similarly, where a unit occupies a large enough region but shows a shape that is nonuniform, exceeds a stipulated range of rates of curvature, or otherwise exceeds geometric model limits, the unit may be tagged as possibly defective. Such information may be presented on the display 28 of FIG. 1, variously in text form 106 or as a graphical image 108 showing the general location of a suspected fragment 112.

Compound element images may be identified as multiple discrete units through application of geometric pattern matching functions. Where predefined or other geometric patterns can be detected within a compound element image, the patterns can be classed as units within the image. The patterns defined by these units may be, in effect, subtracted from the image, leaving the areas obscured by the patterns indeterminate. The remaining image may then have the pattern matching function further applied, and other patterns may in turn be identified. Such an iterative process may permit compound images to be partitioned and counted with acceptable accuracy, and may further allow identification of broken pieces of units. The process may further identify and tag extraneous items—that is, items not having geometric patterns corresponding to units or combinations of units—with these omitted from a count.

In some embodiments, processor 66 may identify touching or overlapping units, allowing counting of units within multi-unit groups in some configurations and directing a user to scatter such groups where likelihood of accurate counting is unacceptably low. It will be understood that a limit on such capability may occur where units such as flat-faced pills—squat cylinders—are stacked substantially perpendicularly to the local view axis of camera 78. Such configurations may reduce the efficiency of the counting machine despite use of procedures outlined above.

Figure 5:
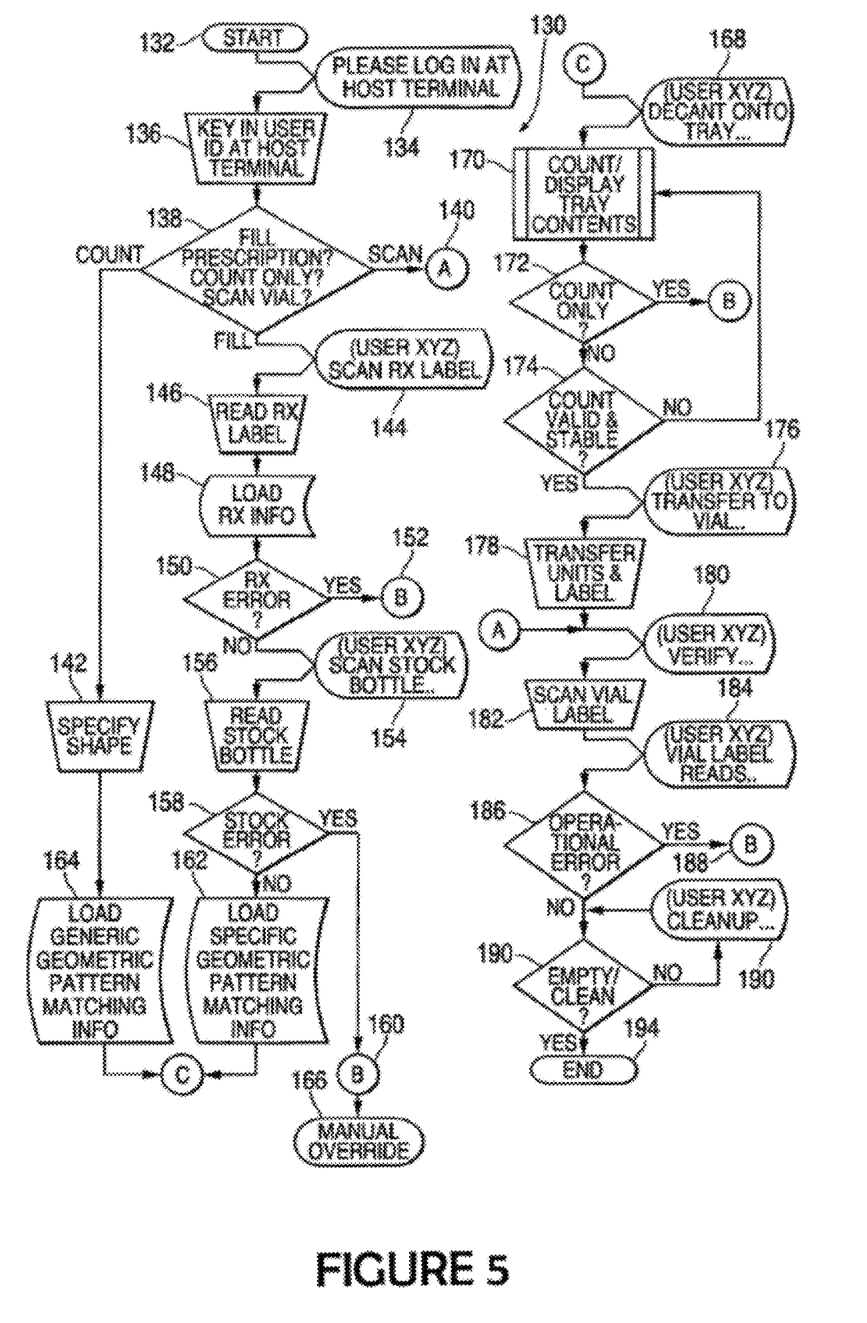
FIG. 5 is a flowchart indicating a procedure followed by a counter according to one embodiment of the invention.

FIG. 5 shows default overall signal flow according to one embodiment of the invention. After initialization, step 132, a user is prompted, step 134 to perform a login function 136, which may be a barcode scan performed by camera 20, 78, or 118. In a standalone system configuration or a configuration wherein the counter 60 (FIG. 3) in use is the master, the term "host terminal" may apply to the counter itself. For such applications, the counter can support digital data entry, such as for login, as a function of the display 86 and of the touch-screen or keypad 88 of FIG. 3. For other embodiments, a host separate from the counter 60 may provide login confirmation input through the communication link 90 of FIG. 3.

Once a user (here, USERXYZ) is recognized, task options, step 138, may include filling a prescription (Rx), performing a count on units not associated with a prescription, and scanning an existing prescription vial. Where the task is limited to scanning an existing vial, count processes are bypassed, and execution jumps, step 140, to a later node in the routine. Where the task is to count units, indication of unit shape may be provided, step 142, by the user to the counter 60, step 130. The shape of the pill is provided by a scan of the appropriate National Drug Code (NDC) or vial identifier, or entered via keypad 88 (FIG. 3). Where the unit shape is known, the user can select the shape from a menu referencing a database, for example. Where the unit shape is not available from a resource, the shape can be specified for the task by defining a geometry in terms of curvature, diameter, and the like, defaulting to a nominal shape and size, or another method.

Where the task is to fill a prescription, counter 60 can prompt the user, step 144, to scan a reference document, step 146, such as a previously prepared prescription label. For some embodiments, a method for scanning may use the bar code scanner 94 (FIG. 3) to read a bar code printed on the label. In other embodiments, the scan process may involve keypad entry of a reference number, or may require entry of text such as prescriber's name, formulation, quantity, and the like, with a label being printed, as a response to the input, using a printer external to counter 60. The user may also have the option of choosing a prescription from the queue. The counter 60 can print a label via printer 54 (FIG. 2).

After the prescription label information is acquired, associated information may be loaded, step 148, from a reference resource external to counter 60, using, for example, the external communication link 90 in FIG. 3. In other embodiments, some or all of the associated information may be contained in a database internal to counter 10. The loaded information may be evaluated for some classes of errors, step 150, such as an unauthorized or already-filled prescription, and, if defective, step 152, brought to the attention of the user, steps 160, 166. Where the information is proper, the counter can prompt the user, step 154, to scan, step 156, a stock bottle (a bulk storage container for a prescription), using the method previously used, step 146, for the label. If the stock bottle is incorrect, step 158, the user is directed to intervene, steps 160, 166; if correct, geometric pattern information for the units may then be loaded from a database, step 162, where the database information is maintained within or external to counter 10.

At this point, the generic counting option and the prescription filling option paths from step 138 converge, with a geometric pattern not associated with a prescription loaded, step 164, and the procedure continuing to the count phase.

The user is then directed, step 168, to decant the units into the tray, after which the count function loop described in FIG. 5 is invoked, step 170. If the procedure is only a count, step 172, then the loop may be limited to a single execution pass. If not, the loop may instead monitor the decanting process by repeatedly executing the counting process, step 170, until a valid count is achieved, step 174, discussed in detail below. To complete the procedure, the user is optionally directed, step 176, to transfer the counted units (and the label, if not previously done) to the final vial, step 178, then to verify, step 180, by rescanning the label, step 182, which is then displayed, step 184. If a mistake has occurred, step 186, the user is directed, step 188, to intervene, steps 160, 166; otherwise, the scan surface is examined for visible contamination, step 190, and the user may be prompted to clean the scan surface, step 192, after which the procedure is finished, step 194.

Figure 6:
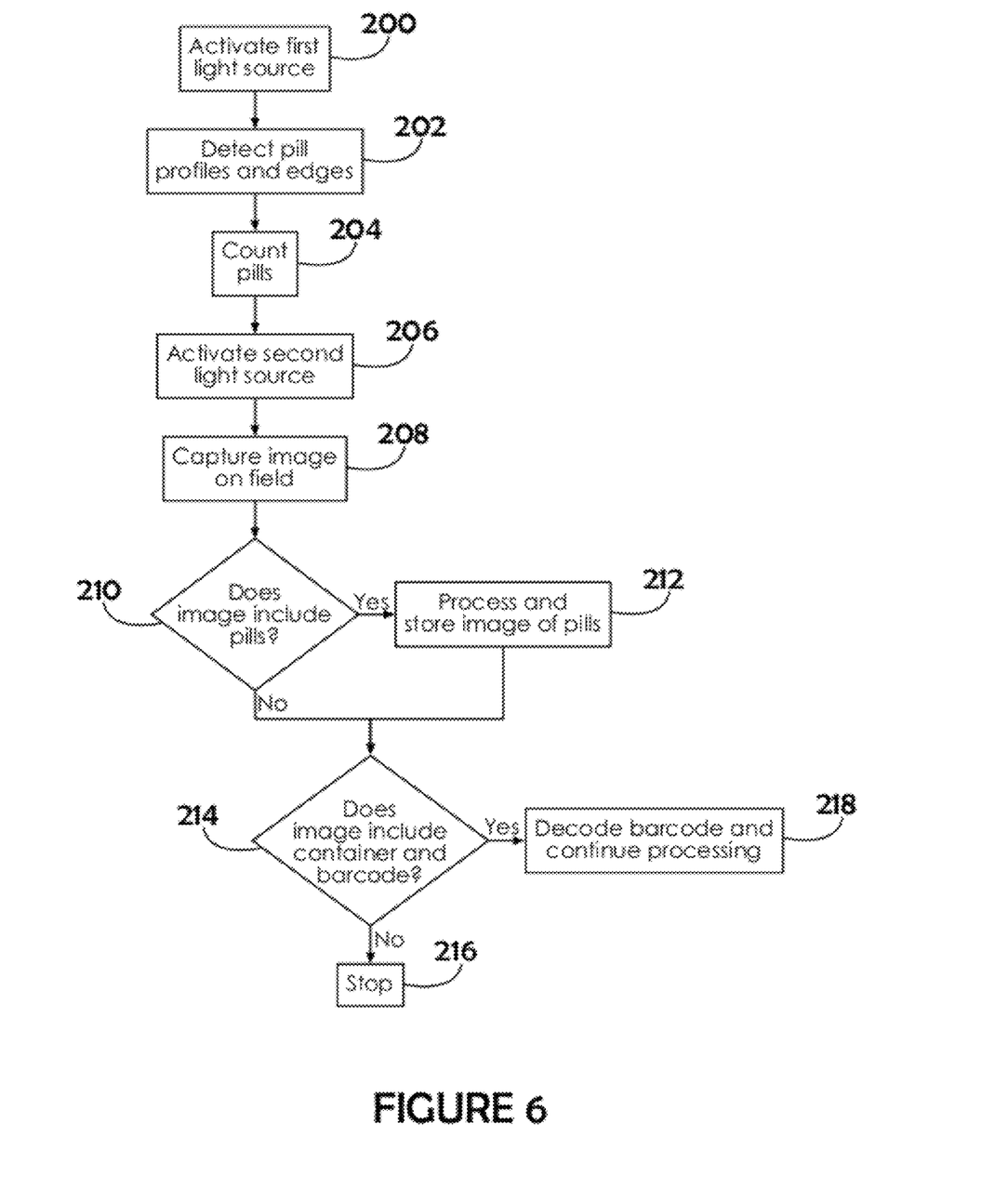
FIG. 6 is a flowchart of image processing acquired by a color camera when pills or pill containers are disposed on or near a tray.

Referring now to FIG. 6, there is shown a flow chart of image processing once color camera 20 (FIG. 1) acquires an image of the units 15 and container(s) 22 (FIG. 2). First light source 16 is activated, step 200, to illuminate units 15 from beneath translucent tray 14 towards camera 20. As aforementioned, first light source is used during the pill counting operation of counter 10.

The system detects pill profiles and edges from color camera image on tray 14, step 202. The system then counts the number of units 15, step 204.

Second light source 26a, 26b is then activated from above the plane of tray 14, step 206. An image of units 15 and container(s) 22 is then captured, step 208. It should be understood that, not only is camera 20 capable of focusing on the plane of tray 14, but, due to its automatic focus feature, any object (e.g., container 22) appearing between tray 14 and camera 20 can also be detected and imaged in this step 208. Thus, a user may introduce a box or vial, for example, into the aforementioned space between tray 14 and camera 20, so that an image thereof can be acquired by camera 20.

The system determines whether the image includes pills, step 210. If so, the system processes and stores the image of pills, step 212. The system then determines whether the image includes one or more containers having respective barcodes, step 214. This step 214 is performed regardless of whether the determination of pills, step 210 is positive or negative. A bar code disposed on tray 14 can also be scanned for confirmation.

If the image does not include one or more containers having a barcode, step 214, processing stops, step 216. If, however, the system determines that the image does include one or more containers having a barcode, step 214, the barcode is decoded and processing continues, step 218.

A greater or lesser security capability may be used in various embodiments. For example, positive identification of a user bearing a scannable badge may be appropriate, whether to maintain audit trail on controlled substances, to monitor employee productivity, or in view of another consideration. To cite another example, stock bottle bar codes may be associated with unit shape definitions in a database. Positive confirmation of unit shape while counting may assure safety and quality control as well as maintaining audit trail.

These or other security aspects may be relevant to particular embodiments. Various features may be included in the inventive apparatus to augment security. The features may include, for example, control of software configuration modification, so that downloading an altered database of geometric data defining unit shape requires a password or other, more rigorous identification. Stock bottles may be provided with geometric data embedded in a bar code, so that no separate database is required, and the bottle and its contents are logically linked. Regarding technology choice between one-dimensional and two-dimensional bar codes, it is to be understood that the embedded geometry describing a specific unit may be more readily implemented in embodiments employing the longer sequences possible with two-dimensional bar codes.

Other features potentially desirable in some embodiments include a requirement for a long and/or encrypted user badge code, embedment within the user badge code of one or more biometrics such as a scan of relative finger length profile, a requirement that a password be changed periodically, or a combination of these and other security measures. It is to be understood that processor-based security functions associated with a counter may include procedures to acquire affirmative information, such as badge code decryption and confirmation, polling of individual subassemblies to acquire and examine condition reports, transmitting test codes and verifying responses, and the like. Thus, an indication that counter security status is good can be derived from an affirmative security test sequence that may be extensive.

Further, negative events may negate a security good indication. For example, a loss of a power good signal from a power supply may generate a processor interrupt for system shutdown without data loss, which can be usable in embodiments where prior system state is needed during restart, for example. Similarly, specific security related or operational negative events may be detected, such as removal of a closure seal on the counter, timeout of a watchdog counter, overtemperature detection from a thermal sensor having go/no go state switching, and the like. Identification of a recognized user may be viewed as an affirmative security procedure enabling operation, while touching a "standby" button on a touchscreen or absence of user input, including change in count or position of units on the tray for a stipulated period, may be viewed as a negative security event initiating disablement of operation. Where appropriate, a security bypass function may be applied to override a disablement function and allow operation of at least one function without direct access to the security sequence required for normal operation. Criteria for such bypasses may be developed for individual embodiments.

Alternate embodiments may employ substantially the same counting algorithm described hereinabove, using imager heads that may not be fixed and oriented downward toward horizontal trays. Such embodiments, using ambient light, scanning lasers, or pulsed, diffused infrared, among other illuminating radiation sources, may count units at various distances from the imager heads. The system can also be adapted to use radio frequency technology, if desired.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A counter for detecting discrete units and bar codes, comprising:
   a housing;
   a first light source for generating electromagnetic radiation;
   a removable, translucent tray having a major plane and being disposed proximate said first light source; and
   an auto focusing, color camera mounted on said housing and above said removable translucent tray for obtaining a color image of discrete units and bar codes, said color image being obtained of said discrete units and bar codes placed at any location intermediate said auto focusing, color camera and said removable translucent tray.

2. The counter in accordance with claim 1, further comprising a lens operatively connected to said color camera.

3. The counter in accordance with claim 1, further comprising a second light source disposed above said major plane.

4. The counter in accordance with claim 3, further comprising means for processing electronic signals, electrically connected to said color camera.

5. The counter in accordance with claim 4, further comprising a machine vision transducer, and wherein said color camera is electrically connected to said machine vision transducer, whereby data correlated to the relative intensity of radiation detected by said color camera is converted to a form suitable for transmission and processing.

6. The counter in accordance with claim 3, further comprising means for detecting information represented in a bar code.

7. The counter in accordance with claim 6, further comprising means for analyzing information represented in a bar code.

8. The counter in accordance with claim 1, wherein said first light source comprises a plurality of LEDs.

9. The counter in accordance with claim 1, wherein said tray comprises light-diffusing means.

10. A counter for counting discrete units, comprising:
    a housing;
    a first light source for generating electromagnetic radiation;
    a removable, translucent tray disposed proximate said first light source;
    an auto focusing, color camera mounted on said housing and above said translucent tray for obtaining a color image of discrete units, said color image being obtained of said discrete units placed at any location intermediate said auto focusing, color camera and said removable, translucent tray; and
    a processor operatively connected to said color camera for analyzing said color image.

11. The counter in accordance with claim 10, further comprising a lens operatively connected to said color camera.

12. The counter in accordance with claim 10, wherein said first light source comprises a plurality of LEDs.

13. The counter in accordance with claim 10, wherein said tray comprises light-diffusing means.

14. The counter in accordance with claim 10, further comprising means for processing electronic signals, electrically connected to said color camera.

15. The counter in accordance with claim 10, further comprising a machine vision transducer, and wherein said color camera is electrically connected to said machine vision transducer, whereby data correlated to the relative intensity of radiation detected by said color camera is converted to a form suitable for transmission and processing.

16. The counter in accordance with claim 10, further comprising a second light source disposed above said tray for illuminating units disposed thereon and objects introduced between said tray and said color camera.

17. The counter in accordance with claim 10, wherein said translucent tray is removable.

18. The counter in accordance with claim 10, wherein said first light source is disposed in said housing.

* * * * *